June 6, 1939.  A. H. JESSEN  2,161,473
POWER-TRANSMISSION MECHANISM
Filed March 15, 1937  2 Sheets-Sheet 1
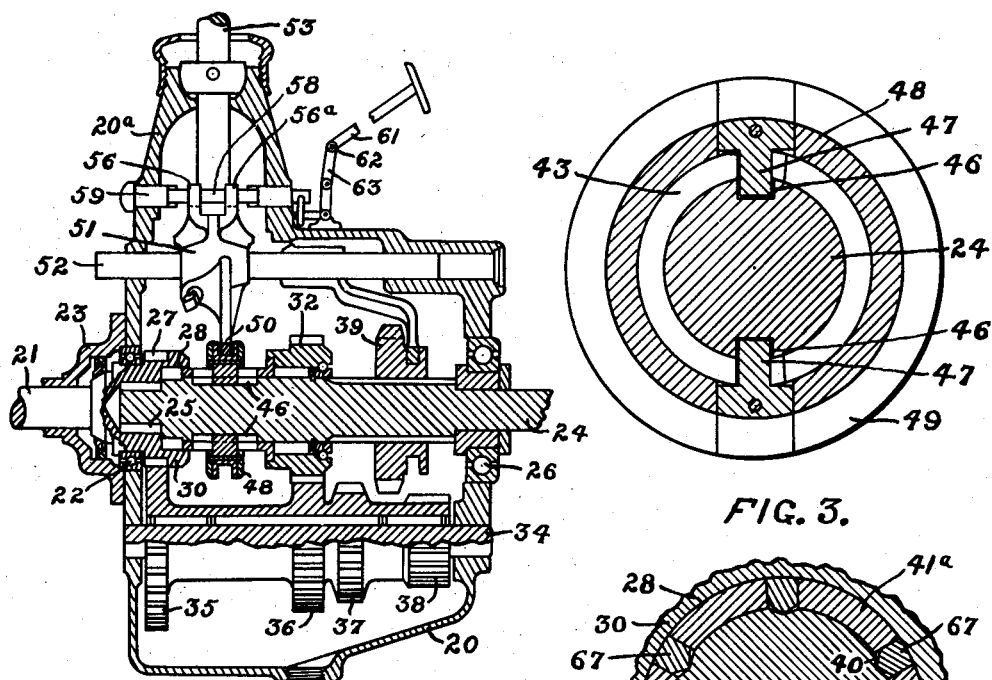
FIG. 1.
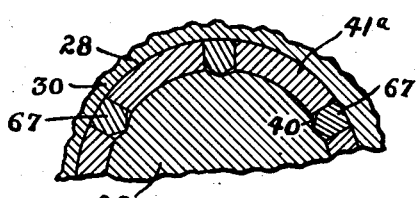
FIG. 3.
FIG. 14.
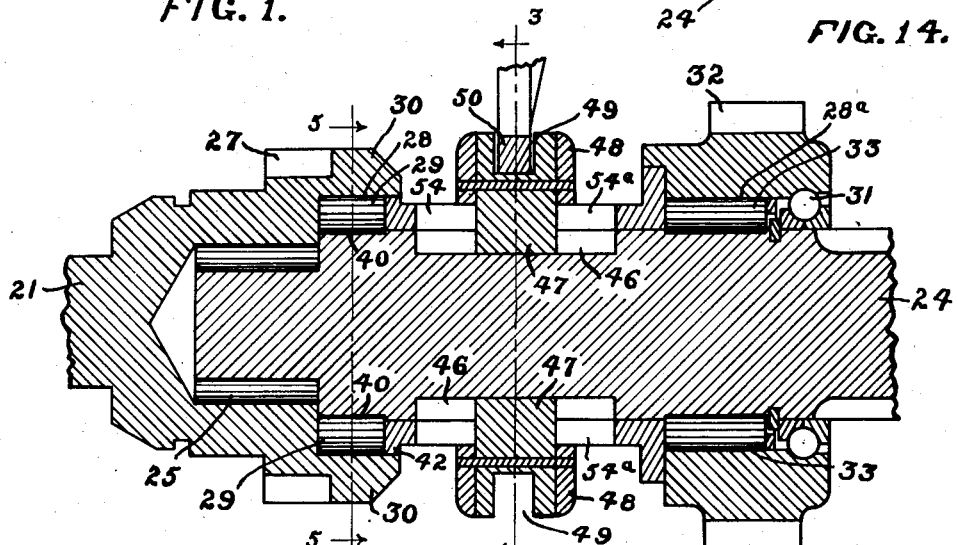
FIG. 2.
INVENTOR
ARNOLD H. JESSEN
BY
ATTORNEY June 6, 1939.  A. H. JESSEN  2,161,473
POWER-TRANSMISSION MECHANISM
Filed March 15, 1937   2 Sheets-Sheet 2

INVENTOR
ARNOLD H. JESSEN
BY
ATTORNEY

Patented June 6, 1939

2,161,473

UNITED STATES PATENT OFFICE 2,161,473

POWER-TRANSMISSION MECHANISM

Arnold H. Jessen, Los Angeles, Calif.

Application March 15, 1937, Serial No. 130,837

11 Claims. (Cl. 192—48)

Figures 9, 10, 11, 12, 13:
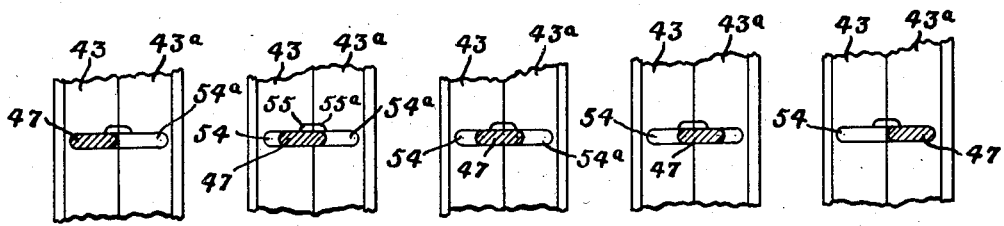

This invention relates to overrunning clutches of the type which is disclosed in my Patent No. 2,065,938, December 29, 1936, and it has for its object the adaptation of clutches of that type to wider fields of utilization. As shown, it is applied to transmission gearing, it being particularly adapted for the changing of speeds of automotive vehicles, although it is capable of more general use. In Fig. 11 of my said patent I have shown how the overrunning clutch is applied to one of the pinions of the transmission gearing. But such gearing usually provide for three speeds in the forward direction and one speed for the reverse. By my present invention, all of these several speeds may be obtained by the simple manipulation of a single shifting lever.

In the accompanying drawings and in the following specification I have described a structure which embodies my preferred form of the invention. However, it is realized that details disclosed may be modified without departure from the principles of the invention and I desire it to be understood that the claims hereof are not intended to be limited to such details any farther than their express terms require.

Figure 4:
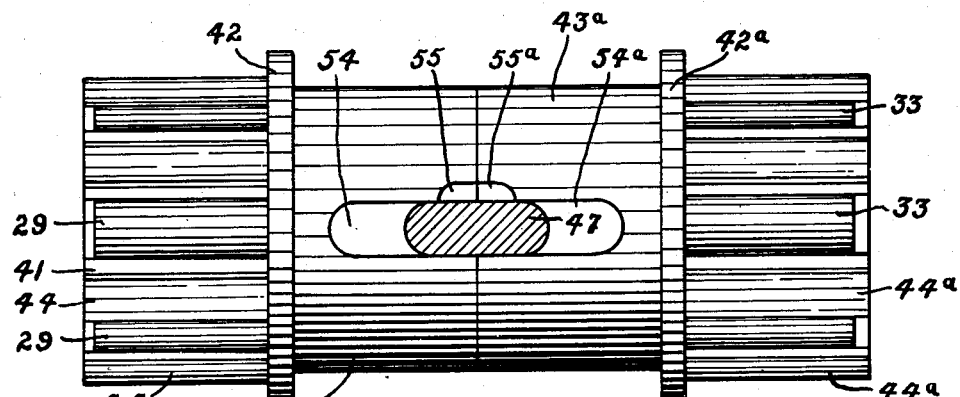
Figure 6:
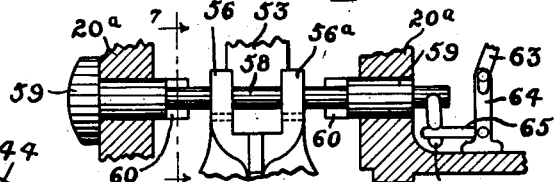
Figure 5:
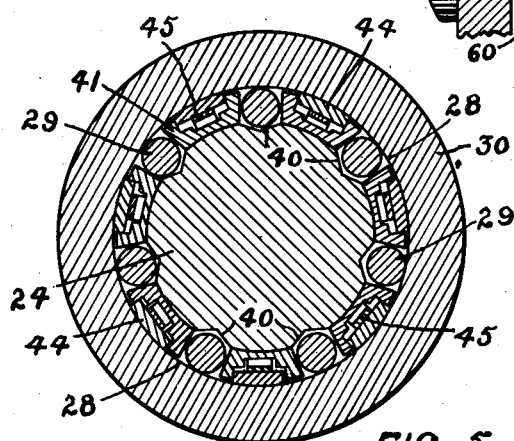
Figures 7, 8:
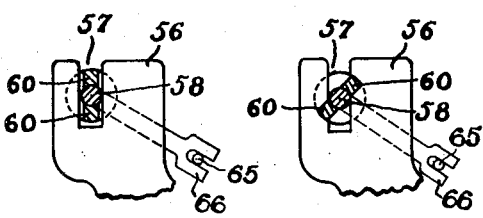
Figure 15:
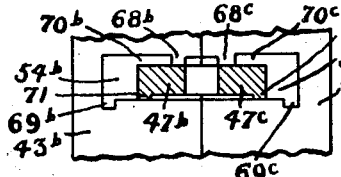
Figure 16:
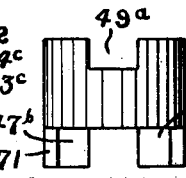

In the drawings, Fig. 1 is a central longitudinal section through the transmission casing showing, partly in elevation, the various gears and the clutch-control mechanism; Fig. 2 is an enlarged view of certain of the parts shown in Fig. 1; Fig. 3 is a cross-section on the line 3—3 of Fig. 2; Fig. 4 is a plan view of the roller cages with the rollers therein, one of the shifting-collar lugs being shown in section; Fig. 5 is a cross section on the line 5—5 of Fig. 2; Fig. 6 is a view partly in section, of a detail of the shifting mechanism; Fig. 7 is a section on line 7—7 of Fig. 6; Fig. 8 is a view like Fig. 7 with some of the parts in a shifted position; and Figs. 9 to 13 are diagrammatic views of the parts shown in the center of Fig. 4 with the shifting-collar lug in its several positions; Fig. 14 is a fragmentary view similar to Fig. 5 but showing a modified structure; Figs. 15 and 16 show a modification of the slotted hubs and the lugs which cooperate with them.

Looking first at Fig. 1, 20 represents, in section, the casing for the transmission gearing. At the left of this casing is shown the adjacent end of the driving member 21 which may be the rear end of the crank-shaft of an engine, the armature shaft of a motor or any other power-driven member. This member extends into the casing 20 and is rotatably mounted on roller bearings 22, being held against longitudinal movement by a boss 23 which surrounds the member adjacent its end and is secured to the casing in any suitable manner. The inner end of the member 21 is enlarged and is hollowed out to receive the end of a driven member 24 which extends through the casing and is journaled in roller bearings at 25 and 26, the bearings 25 being within the enlarged part of the driving member 21, as best seen in Fig. 2. Near its inner end this driving member is further enlarged into a spur gear 27; and, at its extreme inner end it is provided with an interior clutch-engaging, annular surface 28, against which clutch rollers 29 are adapted to roll. That part of the member 21 which contains the clutch-engaging surface 28 is designated 30 and it is so shown in Fig. 5. As will more clearly appear hereinafter, the rollers 29 are adapted to clutch the driving and the driven member together so that they turn as a unit.

Near the middle of the casing 20, the driven member or shaft 24 carries a ball or roller bearing 31 upon which a spur gear 32 is adapted to roll freely when permitted to do so. The gear is an annulus and the shaft 24 extends through it. Its bore is larger than the shaft within it to provide a space for clutch rollers 33. The interior surface, 28ª of the gear is perfectly smooth and is coaxial with the shaft.

Mounted to turn upon a rod or shaft 34, which is secured at its ends within the casing 20 and is extended parallel with the driven member 24, is a series of transmission gears 35, 36, 37 and 38. These gears are all connected rigidly together, being preferably in a single piece. They vary progressively in diameter, as shown. The gear 35 is meshed with the gear 27 of the driving member, while the gear 36 meshes with the gear 32. The gear 37 is adapted for meshing with a gear 39 which is mounted on a splined or fluted portion of the driven shaft 24 and is adapted to be moved to the left, as shown in Fig. 1, into mesh with the gear 37 for slow speed forward or to the right into mesh with an idler, not shown, which meshes with the gear 38, for reverse motion. These gears 37, 38, 39 and the means for shifting the gear 39 form no part of my present invention and further description and illustration of them are deemed unnecessary.

The clutch rollers 29 and 33 are plain cylinders, the axes of which are parallel with the axis of the driven member 24. Those parts of the said member with which the rollers contact are each provided with a series of V-shaped grooves 40, one for each of the rollers, within which the rollers are partially housed, as shown in Fig. 5. Each roller contacts with the inner surface 28 or 28ᵃ of the driving member 21 or the gear 32, extends across the space between the driven member 24 and the said driving member or gear and into its respective groove 40. When it is centered within its groove it can turn freely; but when there is a relative circumferential movement between it and the member 24, it is cammed outwardly by one or the other of the inclined sides of the groove and becomes jammed between it and the outer surface 28 and thus clutches the member 24 and said surface together.

The clutch rollers 29 lie between what may be termed fingers 41 of a roller cage which comprises the said fingers, a central circumferential web 42 and a hub 43 which fits about the member 24, as best seen in Fig. 3. As will be shown, this cage is adapted to be locked to the said member to prevent relative rotative movement between them or to be released from locked engagement and permitted to rotate slightly on the member. When locked, the rollers are held in their central positions and are free to turn on their axes; but when the cage is released it is turned slightly on the shaft 24 and the rollers become jammed, as has been stated. To make certain that the cage will turn when released, means are provided for creating a frictional drag between the surface 28 and the cage. This means comprises a series of friction shoes 44, there being one of these shoes mounted in each of the fingers 41 of the roller cage so as to be capable of radial movement with respect to the axis of the shaft 24, said shoes being pressed outwardly into engagement with the surface 28 by any suitable form of springs 45 behind them. But little friction is required to effect this turning or shifting movement of the cage, and the springs 45 are made as light or weak as is practicable.

Another cage, almost identically like the one described, is provided for the rollers 33, and its parts are designated 41ᵃ, 42ᵃ, 43ᵃ and 44ᵃ to correspond to the similar parts of the first cage. The two cages are turned in opposite directions with their hubs abutting, as shown in Fig. 4. That part of the driven member 24 that is covered by the hubs of the cages is provided with a pair of oppositely-disposed slots 46 into which project lugs 47 on a collar 48, the latter being provided with a circumferential groove 49 to receive a shifting yoke 50. This yoke projects from a member 51 which is attached to a rod 52 that is mounted to slide endwise within the casing 20, this movement being imparted to it by the shifting lever 53 which is mounted for a limited universal movement in an extension 20ᵃ of the casing. This part of the structure is conventional and requires no further description and illustration. As will be understood, when the upper end of the lever 53 is moved to the left, as viewed in Fig. 1, the collar 48 is moved to the right and when the lever is moved in the opposite direction the collar is moved to the left.

The hubs 43 and 43ᵃ of the roller cages are each provided with a pair of diametrically-opposite slots, those in the hub 43 being designated 54 and those in the hub 43ᵃ being designated 54ᵃ. When the shifting collar is in its central or neutral position, the lugs 47 thereon extend through both of the slots 54 and 54ᵃ, as indicated in Fig. 11. When the said lugs are shifted to the left into their extreme positions, as in Fig. 9, the lugs pass through the slots 54 only, and when they are shifted in the opposite direction to the position of Fig. 13, they pass through the slots 54ᵃ only. The open end of one slot is in alinement with the open end of the other slot and the lugs can be shifted freely back and forth. Throughout the greater part of their depth the slots are just wide enough to accommodate the lugs. This part of the slots will be referred to as their narrow part. When the lugs 47 are in these narrow parts the hubs are locked non-rotatively to the driven member 24 and the rollers are maintained in their central positions in the grooves 40. Consequently the rollers do not then function as clutch members. For a short distance in from their open ends the slots are widened, as shown at 55 and 55ᵃ. When the collar 48 is moved to an intermediate position between its central or neutral and its extreme left-hand position, the lugs 47 are partly within the narrow parts of the slots 54, thus locking the hub 43 in its neutral position, and partly within the wide parts of the slots 54ᵃ, as shown in Fig. 10. This wide part of the slots permits the slight relative rotative movement of the hub 43ᵃ on the shaft 24 and allows the rollers 33 to roll up the inclined side of the grooves 40 into clutching position. Similarly, when the collar 48 is moved to an intermediate position in the opposite direction, as indicated in Fig. 12, the hub 43ᵃ is locked to the shaft 24 while the hub 43 is capable of the slight rotative movement necessary for causing the clutching rollers 29 to jam.

Having described my preferred structure, I will now set forth its operation insofar as the gears 27, 32, 35 and 36 are concerned. When the parts are in the position shown in Figs. 1 and 2, the clutch rollers 29 and 33 are all in their neutral positions, as in Fig. 5. That is because the lugs 47 extend into the narrow parts of the slots 54 and 54ᵃ and the hubs of both roller cages are held from rotation on the driven member 24. If the driving member 21 be rotating, the gear 27 is also rotating, driving the gear 32 through the gears 35 and 36. But the driven member 24 is not turned. If, now, the shifting lever 53 be drawn back to shift the lugs 47 to their intermediate position, as in Fig. 10, the clutch rollers 29 are still held in their non-operative positions, because the lugs 47 are in the narrow part of the slots 54. At the same time, however, the hub 43ᵃ is permitted to rotate slightly under the influence of the drag shoes 44 of the gear 32, with the result that the clutch rollers 33 are carried up the inclined sides of the grooves 40 and are jammed between those sides and the surface 28ᵃ of the said gear 32. That gear is thus clutched to the driven shaft 24 and the latter is rotated at the intermediate speed. In the direction of the applied torque, the speed of the shaft must be at least as great as that of the gear. But its speed can exceed that of the gear; for if the gear be turning more slowly, the backward drag of the shoes 44 will simply move the rollers 33 back to their central or non-operative position. They cannot be moved farther than that because the straight side of the slots 54ᵃ will engage the lugs 47 when that position is reached. It will be seen, therefore, that when the parts are positioned as indicated in Fig. 10, the clutch locks in one direction only; and if the structure be employed in an automotive vehicle, there is free wheeling in the forward direction. That is what may be termed the single lock set-up.

If, now, the lugs 47 be shifted in the same direction to the end of the slots 54, as in Fig. 9, the hub 43ᵃ is free to shift in either direction, being entirely free from the lugs. Consequently, the rollers 33 will clutch on either side of the V-shaped grooves. This is the double lock set up. The driven member 24 is clutched to the gear 32 so that there can be no relative movement between them more than is necessary for shifting the rollers from one inclined side of the grooves to the other. No free wheeling is possible with this set-up.

When the lugs 47 are shifted into the position indicated in Fig. 12, the hub 43 may turn sufficiently to allow the rollers 29 to clutch the driving and driven members together and the two will turn as a unit at high speed. At the same time, the hub 43a will be held by the engagement of the lugs within the narrow part of the slots 54a and the rollers 33 will be non-operative. But the driven member may outrun the driving member in the direction of the torque and thus free-wheeling at high speed is possible for the same reasons as were set forth in the discussion of Fig. 10. Fig. 12, therefore, shows the high-speed, single-lock set-up.

Fig. 13 shows the high-speed double-lock set-up. The lugs 47 are entirely within the slots of the hub 43a and the hub 43 is free to move in both directions. No free wheeling is possible in this set-up.

In shifting from the neutral to either intermediate position, as indicated in Figs. 10 and 12, the operator is liable to move the lever 53 either too far or not far enough and thus fail to position the lugs properly within the hub slots. To insure that these lugs will be moved to and stopped at their proper positions, I have provided the stop mechanism which is shown in Figs. 1, 6, 7 and 8. The shifting member 51 is provided with a pair of upstanding lugs 56 and 56a in the upper ends of which are vertical slots 57 through which extends a rod or shaft 58. The central part of this rod has a diameter which is but slightly less than the width of the slots. The ends, however, are enlarged at 59 and are journaled in the casing extension 20a. The inner ends of these enlarged ends form stops for arresting the movements of the shifting collar 48 at the ends of its strokes when the lugs 47 are brought into the positions indicated in Figs. 9 and 13. Each of these end portions is provided with a pair of diametrically-disposed lugs 60 which extend parallel with the shaft 58 and have a thickness substantially equal to the diameter of the shaft. When the shaft is in the position shown in Figs. 6 and 7, the lugs 56 and 56a may be shifted to their full extent to be arrested by contact with the enlarged ends 59 of the shaft, since the lugs 60 may then enter the slots 57 without interference with the lugs 56 or 56a, as the case may be. When, however, the shaft 58 is rotated, as indicated in Fig. 8, these lugs extend more or less transversely of the slots so as to be engaged by the lugs 56 or 57 and thus arrest the movement of the shifting collar when the lugs 47 are in their intermediate positions, as indicated in Figs. 10 and 12. It will be noted that the shaft 58, with its enlarged ends and stop lugs 60, forms not only a means for controlling the extents of movement of the shifting collar, but is also a guide which holds the member 51 in its upright position, as in Fig. 1. Any suitable hand or foot-operated means may be employed for turning the shaft 58. In the operation of modern automotive vehicles, the driver releases the clutch before shifting the gears and he does this by depressing the clutch pedal. It would be convenient and in accordance with the above-stated practice, to rock the shaft 58 by means connected with the clutch pedal, and such a means is indicated in Figs. 1 and 6, wherein the pedal is shown at 61. It is pivoted at 62 and is provided with a downwardly-extending arm 63. As best shown in Fig. 6, this arm has a pin and slot connection with a bell-crank 64 which has an arm 65 adapted for engagement with a pin 66 on the shaft 58. As indicated in Fig. 6, this pin is preferably forked to receive the arm 65 in order that the shaft be returned to the position of Fig. 6 when the pedal is released. The pin 66 is rigidly attached to the shaft 58 and the shaft must turn as the pin is moved by the arm 65. Figs. 7 and 8 show, partly in dotted lines, the forked construction of the pin 66, and this is shown in Fig. 6 as well. The shaft 58 could be returned to its normal position of Fig. 7 by various kinds of means; but the spring which sets the clutch (not shown) is admirably adapted for that purpose. When, therefore, the pedal 61 is released and the clutch spring causes the clutch to engage, the shaft 58 is automatically restored to its normal position, as in Fig. 7.

In Fig. 14 I have shown a modified structure of the means for clutching the driven member to the gears 27 or 32. Instead of using rollers, such as 29 or 33, I employ non-cylindrical elements 67 which are inserted between the fingers 41a of the cages. The outer surfaces of these elements are rounded to fit against the surface 28 or 28a of the respective gears, while the inner surfaces are V-shaped, as shown, and are projected into the V-shaped grooves 40 of the driven member. When in their central or neutral positions, the apices of the elements extend into the apices of the grooves, as in Fig. 14, while the outer surfaces contact lightly with the surface 28 or 28a. Instead of having single lines of contact, as do the rollers 29 and 33, the elements 67 bear against a much more extended area and produce sufficient friction to shift the cages. Consequently, in this structure no friction shoes, such as 44, are required, and the outer surfaces of the fingers 41a are continuous circumferentially, as shown. When either of the cages is released for shifting, as has been described, the elements 67 are shifted with it about the member 24. The inclined walls of the grooves 40, acting as cams, press the elements more lightly against the surface 28 or 28a of the gears until they jam and clutch the member 24 to the gears.

Fig. 15 is a fragmental view of a modified form of the hubs for the cages, the hubs being designated 43b and 43c and the slots 54b and 54c. When the hubs are in their normal or neutral positions, the slots are in alinement. Projecting inwardly from what is shown as the upper side of the slots are lugs 68b and 68c, and extending outwardly from the lower side thereof are notches or widened portions 69b and 69c. Between the lugs and the respective outer ends of the slots are widened portions of the slots, designated 70b and 70c. Slidable within the said slots are a pair of lugs 47b and 47c which project from a body member having a slot 49a which corresponds to the slot 49 of Fig. 2. Projecting from the lug 47b is a widened portion 71 which is adapted to enter the part 69b of the slot 54b, and a similar widened portion 72 projects from the lug 47c and is adapted to enter the widened portion 69c of the slot 54c. Although the driven shaft 24 does not appear in Fig. 15, it is to be understood that the lugs 47ᵇ and 47ᶜ project into the slot 46 of the shaft as do the lugs 47 of Fig. 2.

When the parts are in the positions shown in Fig. 15, the cages are locked to the shaft and the clutch elements 29, 33 or 67 are in their non-operative position. When the lugs are shifted to the left in Fig. 15 until the lug 47ᵇ clears the projection 68ᵇ, the cage hub 43ᵇ can shift to bring the said lug into the widened portion 70ᵇ. But the said hub cannot shift in the opposite direction because the part 71 of the lug is still in engagement with the lower edge of the slot 54ᵇ. When, however, the lug 47ᵇ is moved the next step, the part 71 thereon is brought into position to enter the notch 69ᵇ, and the cage hub 43ᵇ can then shift in both directions. Thus may the hub be held in neutral, be locked in one direction only, or be freed to shift in either direction for the purposes described in connection with Figs. 9 to 13. While the lug 47ᵇ is thus controlling the cage hub 43ᵇ the lug 47ᶜ is holding the cage hub 43ᶜ in its neutral position. To control the latter hub, the lugs are moved to the right, during which movements the hub 43ᵇ is held in neutral. It will be noted that whereas, in the structure of Fig. 2, one of the cage hubs is controlled by moving the lug 47 in the direction away from that hub, in the structure of Fig. 15 the hub is controlled by moving its lug 47ᵇ or 47ᶜ toward it. In other words, the lugs are shifted in different directions in the two structures. In both cases, the clutch elements are maintained in their neutral positions, are caused to clutch in one direction only or in both directions all by the movements of a single operating lever or other suitable device.

I claim as my invention:

1. In clutch means for connecting two relatively rotatable members, said members being axially alined, a driven shaft extending axially within said members, both of said members having axial bores about the shaft and larger than the shaft whereby a circumferential space is left between the shaft and the inner walls of said bores, the shaft being provided with grooves at those parts which are surrounded by said spaces, said grooves having an inclined side wall serving as a cam, clutch elements within said spaces and grooves, a pair of cages surrounding the driven shaft between the said members, means projecting from one of the cages into the space of one member and engaging the clutch elements in said space to move said elements, similar means projecting from the other cage into the space within the other member and engaging the clutch elements therein, the adjacent ends of the cages each being provided with a slot and the driven shaft also having a slot adapted to register with the slots in the cages, a collar surrounding the said cages, a lug projecting from said collar through one or both of said cages and into the slot in the said shaft, means for shifting the said collar longitudinally of the shaft to cause the lug thereon to engage one or both the collars within the slots therein, whereby either or both of said collars becomes locked to the shaft or is freed from the shaft and the freed collar may turn on the shaft to move its clutch elements up an inclined side of the groove in the shaft and into clutching relation with the respective gear.

2. Power-transmission mechanism as set forth in claim 1 in which the means projecting from the cages into the spaces within the members comprises spaced fingers and in which the clutch elements are rollers which are rotatably contained between pairs of said fingers.

3. Power-transmission mechanism as set forth in claim 1 in which the means projecting from the cages into the spaces within the members comprises spaced fingers, each of which is provided with means engaging the wall of the bore of the respective member to create friction and cause the freed cage to move rotatably on the driven shaft, thus to cause the clutch elements of the latter cage to clutch the said shaft to the respective member.

4. Power transmission mechanism as set forth in claim 1 in which the means projecting from the cages into the spaces within the members comprises spaced fingers, each of which is provided with a shoe having a friction surface fitting against the wall of the bore of the respective member to produce a drag between the cage and said wall to cause the freed cage to move rotatably on the driven shaft, thus to cause the clutch elements of the latter cage to clutch the said shaft to the respective member.

5. In power-transmission mechanism comprising two spaced and coaxially disposed driving gears each of which is provided with an interior annular clutch surface, and having means for rotating said gears at different speeds, a driven shaft coaxial with the said gears and within the said clutch surfaces thereof, being spaced from said surfaces, said shaft being provided with V-shaped grooves on its parts which are within the clutch surfaces of said gears, a pair of independently movable cages mounted upon the shaft between the said gears, one of said cages projecting into the space within the clutch surface of one gear and the other cage projecting into the space within the clutch surface of the other gear, clutching elements in the projecting parts of said cages within the said spaces and within the respective V-shaped grooves in the driven shaft, each of said cages having a hub part extending toward the other cage and each of said hub parts having a slot in its end, said slots being in alinement and opening toward each other and being widened at their open ends and said shaft having a slot therein in register with the narrow parts of the hub slots when the clutching elements are centered in the V-shaped grooves of the shaft, a lug mounted to reciprocate in said hub slots and in the slot in the shaft, and means for reciprocating said lug toward and from the said gears, for the purposes specified.

6. Power-transmission mechanism as set forth in claim 5 in which the clutching elements are rollers having their axes parallel with the axis of the shaft.

7. Power-transmission mechanism as set forth in claim 5 in which the lug which reciprocates in the hub and shaft slots has a thickness which is substantially equal to the width of the narrow parts of the hub slots and a width which is greater than the widened parts of said slots so that the hubs are held non-rotatable on the shaft while the lug is in a central position and is within the narrow parts of the slots of both hubs, but either hub is permitted a slight turning movement on the shaft when the lug is shifted from its central position and is out of the narrow part of the movable hub.

8. Power-transmission mechanism as set forth in claim 5 in which the lug which reciprocates in the hub and shaft slots extends across the widened part of both of the hub slots and into the narrow parts of said slots when the lug is in its central position so that both of said hubs are held non-rotatable on the shaft and all the clutching elements are maintained out of clutching engagement with the inclined sides of the V-shaped grooves, in which, when said lug is moved to an intermediate position, it is removed from the narrow part of one of the hubs and that hub is free to rotate slightly on the shaft in one direction only to cause its clutching elements to engage with one inclined side of the corresponding V-shaped grooves to clutch the shaft to the respective gear, the lug then projecting into the narrow part of the slot of the other hub and holding it against rotation on the shaft, in which intermediate position the shaft is driven with the gear but may overrun the latter, and in which, when the lug is moved to its third position, it is freed from the narrow part of the slot of the previously rotatable hub and the latter is then free to rotate in both directions on the said shaft to cause its clutching elements to engage with either of the inclined sides of the V-shaped grooves, thus to prevent overrunning of the shaft.

9. Power-transmission mechanism comprising two spaced and coaxially disposed driving gears each of which is provided with an interior annular clutch surface, means for rotating said gears at different speeds, a driven shaft coaxial with said gears and within the said clutch surfaces thereof, being spaced from said surfaces, said shaft being provided with V-shaped grooves on its parts which are within the clutch surfaces of said gears, a pair of independently movable cages mounted upon the shaft between the said gears, one of said cages projecting into the space within the clutch surface of one gear and the other cage projecting into the space within the clutch surface of the other gear, clutching elements in the projecting parts of said cages within the said spaces and within the respective V-shaped grooves in the driven shaft, each of said cages having a hub part extending toward the other cage and each of said hub parts having a slot in its end, said slots being in alinement and opening toward each other and being widened at their open ends and said shaft having a slot therein in register with the narrow parts of the hub slots when the clutching elements are centered in the V-shaped grooves of the shaft, a lug mounted to reciprocate in said hub and shaft slots, means for reciprocating said lug toward and from the said gears, said lug when in its central and neutral position extending across the widened parts of both hub slots and into the narrow parts of said slots and holding both hubs against rotation on the said shaft and maintaining all the clutching elements out of clutching engagement with the shaft, the said lug when in its intermediate position remaining in the narrow part of the slot in the hub toward which it is moved and extending into the widened part only of the slot in the other hub whereby the latter hub is free to turn slightly on the shaft in one direction only to cause its clutching elements to move up one inclined side of the V-shaped grooves to establish an overrunning clutching engagement between the shaft and the respective driving gear, and the said lug, when in its third position being free from the said other hub so that the latter may turn slightly in either direction on the shaft to establish clutching engagement between the respective gear and either side of the V-shaped grooves, thereby preventing overrunning of the shaft with respect to the gear.

10. Power-transmission mechanism as set forth in claim 9 having manually controlled means for arresting the said lug in its intermediate positions.

11. Power-transmission mechanism as set forth in claim 9 embodied in an automotive vehicle having a clutch pedal, means for arresting the said lug in its intermediate positions, and connections between said latter means and the said clutch pedal.

ARNOLD H. JESSEN.